United States Patent
Brooks

[11] B 3,913,395
[45] Oct. 21, 1975

[54] TEST FIXTURE FOR DETERMINING STATIC AND DYNAMIC LOADING ON CLUTCH PLATES

[75] Inventor: Roger Dean Brooks, Waterloo, Iowa

[73] Assignee: Deere & Company, Moline, Ill.

[22] Filed: May 25, 1973

[21] Appl. No.: 363,892

[44] Published under the Trial Voluntary Protest Program on January 28, 1975 as document no. B 363,892.

[52] U.S. Cl. .................. 73/118; 73/141 A; 73/161
[51] Int. Cl.² ......................................... G01M 19/00
[58] Field of Search.... 73/88 R, 133 R, 140, 141 A, 73/161, 118, 121

[56] References Cited
UNITED STATES PATENTS

| | | |
|---|---|---|
| 2,044,818 | 6/1936 | Spase ............................ 73/118 UX |
| 2,655,809 | 10/1953 | Edens .................................. 73/161 |
| 2,693,109 | 11/1954 | Gould et al. ......................... 73/161 |
| 2,992,556 | 7/1961 | Webster ............................ 73/141 A |
| 3,087,330 | 4/1963 | Metzmeier .......................... 73/140 |
| 3,124,770 | 3/1964 | Ciavatta ....................... 73/141 A X |
| 3,415,115 | 12/1968 | Newell .................................. 73/121 |

FOREIGN PATENTS OR APPLICATIONS 209,809   9/1968   U.S.S.R. ............................. 73/140

Primary Examiner—Charles A. Ruehl

[57] ABSTRACT

A test fixture for measuring the force exerted by a clutch pressure plate during both static and dynamic loading includes an annular conical-shaped disk spring interposed between and in gripping engagement with the pressure plate and a support member. The disk spring has affixed thereon a plurality of strain gages whose resistance varies in proportion to the deflection of the spring. This variation of resistance is electrically determined and used for determining the pressure force.

8 Claims, 4 Drawing Figures

3,913,395

TEST FIXTURE FOR DETERMINING STATIC AND DYNAMIC LOADING ON CLUTCH PLATES

BACKGROUND OF THE INVENTION

This invention relates to test fixtures and more particularly to a test fixture for determining the pressure force of a clutch pressure plate during both static and dynamic loading.

Clutch pressure plate assembly loading is important as it must be known in order for an engineer to design and develop clutch disks having working properties sufficient to provide the necessary clutching between an engine flywheel and a transmission and to prevent, on the one hand, clutch slippage and, on the other hand, sticking of the clutch disk which would prevent disengagement of other pressure plates. Heretofore, clutch disk load specifications have been given in the static condition only; that is, under conditions when the pressure plate is at a standstill and not rotating. These static specifications have not been fully satisfactory since under actual dynamic operating conditions, when the pressure plate is rotated, the loading on the clutch disk changes due to centrifugal force on the component parts of the pressure plate assembly, and hence the determination of the static characteristics of a pressure plate assembly is insufficient to assure proper clutch disk specifications.

SUMMARY OF THE INVENTION

In accordance with the invention, an annular conical-shaped disk spring has bonded thereto a plurality of strain gages electrically interconnected to indicate the strain on the spring due to the force of the clutch pressure plate under both static and dynamic conditions. The disk spring is sandwiched between and in gripping engagement with the pressure plate and an engaging member such as a flywheel. The deformation of the spring is detected by the strain gages and registered on a strain-gage indicating instrument.

It is therefore an object of this invention to present a testing device for determining the pressure plate load specifications under both static and dynamic conditions.

It is another object of this invention to present a testing fixture using a conical-shaped disk spring for determining both static and dynamic loading characteristics of the pressure plate assembly.

A further object of this invention is to present a pressure plate testing device using strain gages affixed to a conical-shaped disk spring for electrically measuring the strain deflection of a spring caused by the loading of the pressure plate.

DESCRIPTION OF THE PREFERRED EMBODIMENT

Before entering into the detailed description, it is to be understood that the invention is not limited in its application to the details of construction and arrangements of parts illustrated in the accompanying drawings, since the invention is capable of other embodiments and of being practiced and carried out in various ways. Also, it is to be understood that the phraseology or terminology employed herein is solely for the purpose of description.

Figure 1:
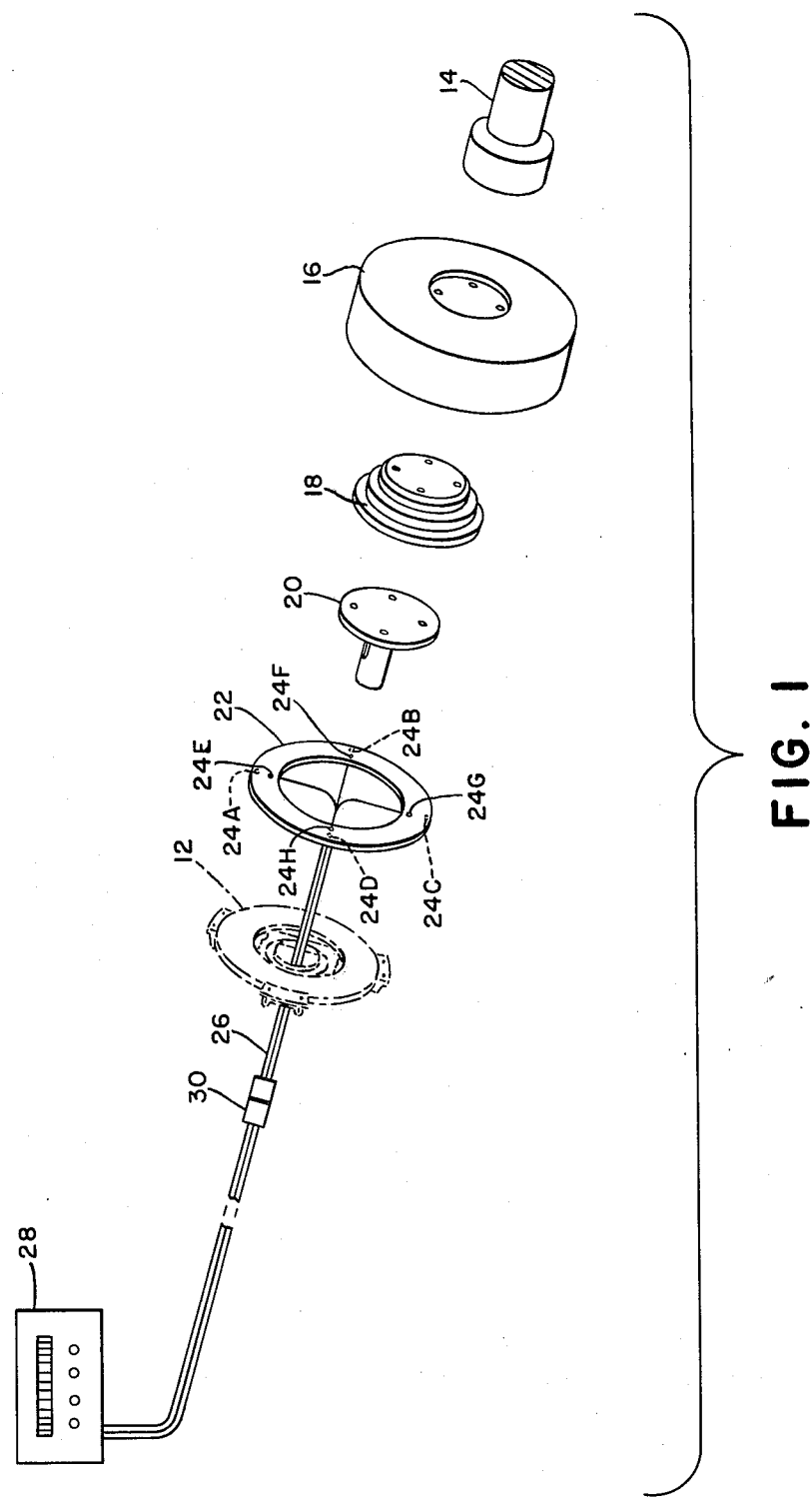
FIG. 1 is an exploded view showing the components of the testing fixture of this invention.

Turning now to the exploded view of FIG. 1, the components of the testing fixture of this invention are shown in their relative positions in relation to a clutch pressure plate assembly 12, shown dashed-dotted in the Figure. The testing fixture utilizes the principal that the elastic deformation of an annular conical disk spring is proportional to the force applied to the spring and that this elastic deformation can be accurately detected by strain gages and mathematically converted into desired weight/area units, normally pounds per square inch.

The testing fixture includes a prime mover 14 which rotates an engaging member 16 over a regulatable speed range as the pressure plate load characteristics are recorded.

An adapter plate 18 and a tubular pilot 20 are rigidly secured to engaging member 16 and serve to properly position pressure sensing means or an annular, conical-shaped disk spring 22 which includes a plurality of strain gages 24A–24H which are bonded thereto. Electrical conduits 26, including a slip ring connector 30, electrically interconnect the strain gages 24A–24H to each other and to a strain indicator 28.

Figure 2:
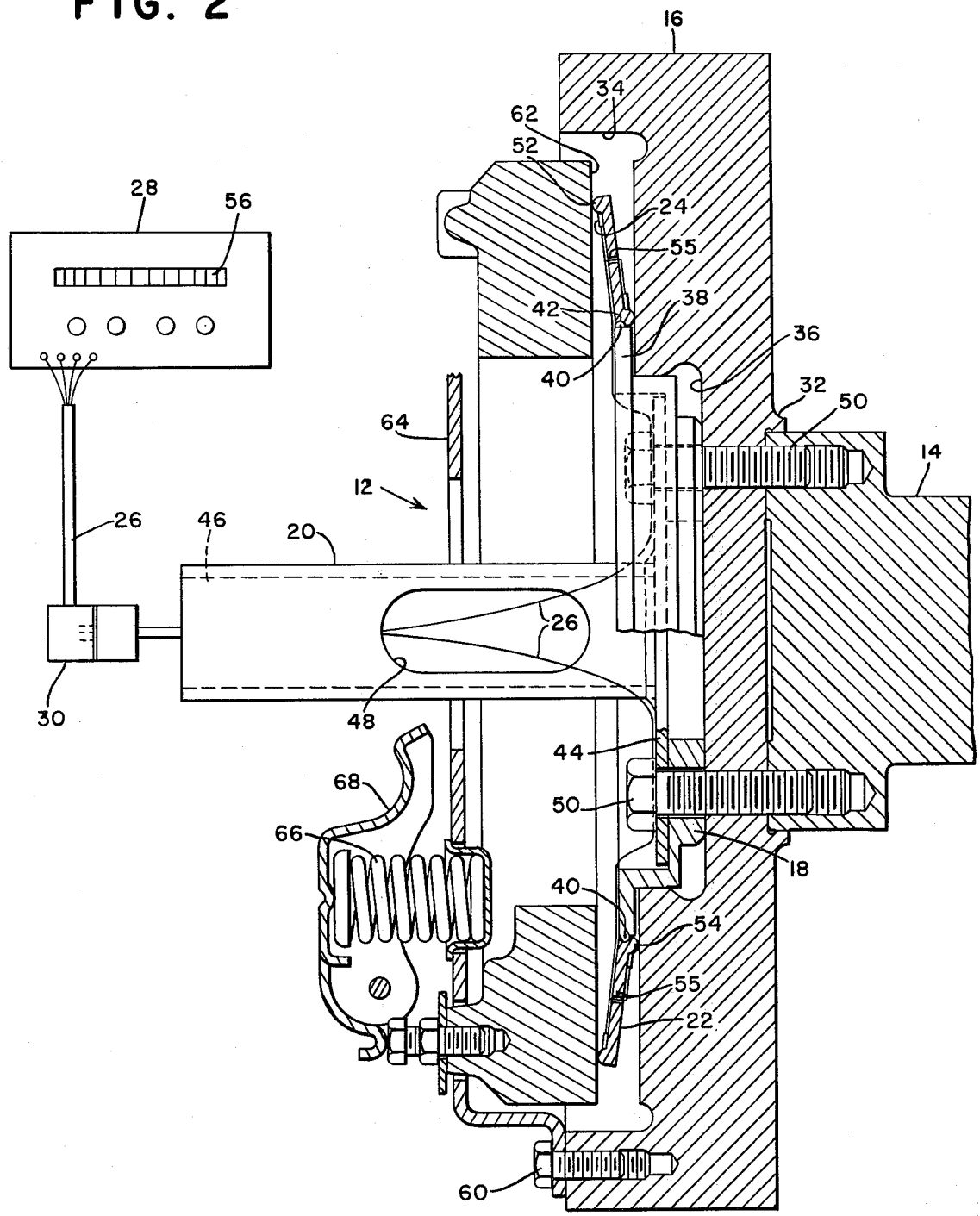
FIG. 2 is a side cross sectional view of the testing fixture of this invention.

In FIG. 2, the components of the test fixture of this invention are shown in working cooperation for measuring the force characteristics of the pressure plate assembly 12 during both dynamic and static conditions.

Prime mover 14, which may be any suitable rotative source such as the crankshaft of an internal combustion engine, is rigidly affixed to the engaging member 16 which, during the test procedures, acts in the same manner as a flywheel of an engine. Engaging member 16 includes, on the side facing prime mover 14, an annular flange 32 forming a receptacle for receiving prime mover 14. On its other side, the engaging member 16 includes an outer annular recess 34 and an inner annular recess 36. Received within inner and outer recesses 34 and 36 is adapter plate 18 which serves to concentrically position conical-shaped disk spring 22 with engaging member 16. Adapter plate 18 is rigidly affixed to engaging member 16 for common rotation therewith and includes an outwardly depending flange 38 having an outer diameter slightly less than the inner diameter of disk spring 22. A plurality of lugs 40 projecting outwardly from the outer periphery of flange 38 engage mating notches 42 on the inner diameter of the conical-shaped disk spring 22 to prevent relative rotative movement between the adapter 18 and the disk spring 22, but which do not inhibit axial movement between the adapter and the disk spring.

Appropriately secured to the adapter plate 18 is pilot 20 which includes an annular affixing plate 44 and a central tubular member 46 having an ingress slot 48 for permitting entry of electrical conduits 26 into the hollow interior of the tubular member. Cap bolts 50 provide a convenient means for rigidly fastening together the pilot 20, adapter 18, engaging member 16 and prime mover 14.

Conical-shaped disk spring 22 consists essentially of a circular disk dished to a conical shape and having a width approximately the same as a clutch disk. When load is applied, the disk tends to flatten out and this elastic deformation constitutes a spring action from which the pressure force exerted by the pressure plate can be determined. Disk spring 22 includes an outer annular boss 52 around its outer periphery on the side facing the pressure plate assembly 12 and further includes an inner annular boss 54 around its inner diameter on the side facing engaging member 16. Bosses 52 and 54 present raised surfaces for contacting the pressure plate assembly and abutting surface of engaging member 16, respectively, and maintain a spacing between these surfaces and strain gages 24A–24H affixed to disk spring 22. This spacing is necessary because if the gages were to come in contact with either the pressure plate or the abutment member, erroneous readings would be obtained. Disk spring 22 also includes four conduit passageways 55 through which conduits 26 are led from the strain gages to the adapter plate 18.

The strain gages 24A–24H, shown in FIG. 2, are of the resistance type in which compression or tension on the gage causes minute changes in the cross sectional area of small wires which, in turn, vary the amount of electrical resistance of the gage. These gages are commercially available and reference is made to any of the various manufacturers' bulletins for construction and operation of the strain gage. Generally, each gage consists of a grid of wire cemented between two pieces of thin backing. Larger size lead wires are welded to the ends of the grid in order to facilitate electrical coupling of each gage to strain-gage indicator 28. The gages 24 are bonded, such as by epoxy means, to the conical-shaped disk spring adjacent bosses 52 and 54 in order to prevent contact of the gage with the pressure plate or engaging member 16. Bonding of the strain gages to the disk spring is done in the conventional manner as set out in the instructions for installation of the gage in the manufacturers' bulletins. Generally, for a satisfactory performance, the bond between the bonding agent and the wire grid must be stronger than the grid itself. Obviously, types of strain gages other than the resistance-type could be employed without departing from the scope of the invention.

Figure 3:
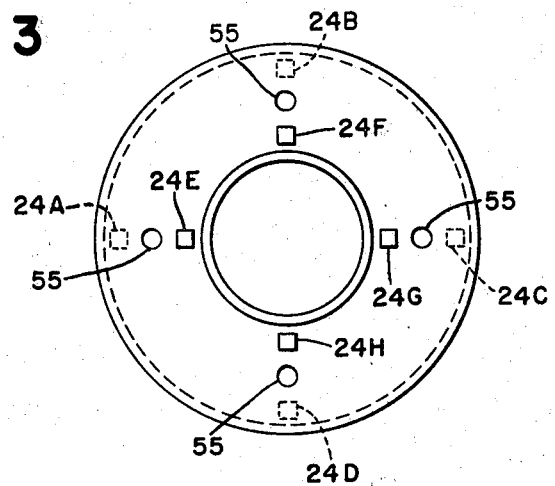
FIG. 3 is a view of a disk spring showing the placement thereon of strain gages, elements of this invention.

The invention is not limited to any specific number of strain gages. By way of illustration, in FIG. 3 of the drawings, four equally spaced apart strain gages on each side of the disk spring have been shown and it has been discovered that with this number of gages so arranged, sufficient accuracy is obtained in measuring the deformation of the spring.

Returning to FIG. 2, conduits 26, electrically connecting the strain gages to the strain indicator, are bonded to the surface of the disk spring 22 and also to adapter 18 in order to prevent inadvertent pinching of the conduits. The conduits are fed from the adapter plate through slot 48 into the hollow interior of pilot 20, which provides a means for bringing the conduits out to slip ring connector 30. Slip ring connector 30 permits rotation of disk spring 22 and conduits 26 without tangling of the conduits. From the slip ring, conduits 26 lead to measuring means or strain indicator 28.

The strain indicator is also commercially available and the interconnecting of the strain gages to the input connection of the indicator is fully set forth in the manufacturer's instruction manual for the strain indicator. Generally, a strain indicator utilizes a null balance resistance bridge which is oscillator excitable, and which has various adjustments for balancing. The bridge output is amplified and is then fed to a phase sensitive demodulating circuit which supplies the balance meter with a DC voltage proportional to the bridge unbalance. A meter 56 on the strain indicator indicates a positive or negative unbalance depending on the sign of the unbalancing strain. The null meter is calibrated in strain units, usually in microinches/inch.

Figure 4:
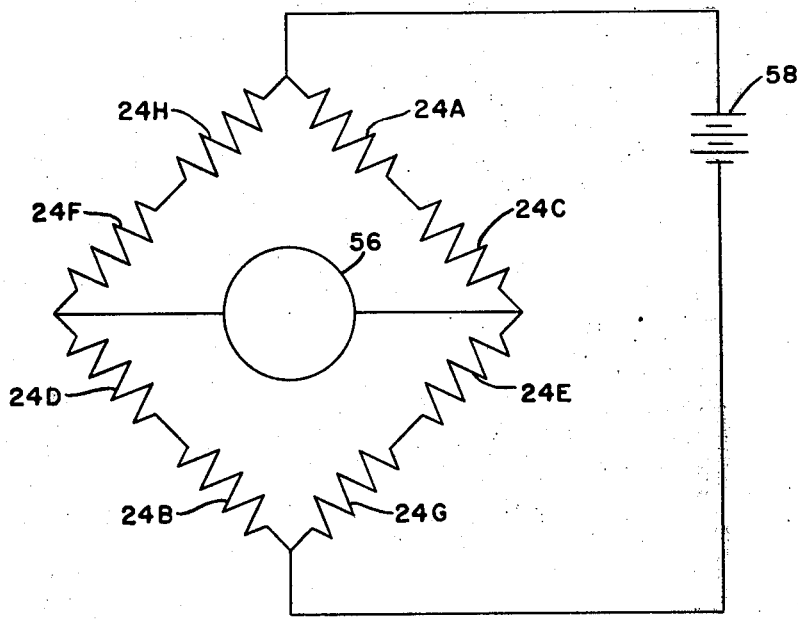
FIG. 4 is a schematic showing the electrical interconnections of the strain gages and strain-indicating means, elements of this invention.

FIG. 4 is a schematic of the electrical interconnections of the strain gages with the strain indicator. The strain gages form a bridge with gages 24A and 24C forming one leg, 24B and 24D a second leg, 24E and 24G the third leg, and 24F and 24H the fourth leg. The positive side of a power source 58 is connected to the bridge between gages 24A and 24B, while the negative side is connected between gages 24B and 24G. Null meter 56 is connected between gages 24D and 24F and 24C and 24E.

Clutch pressure plate assembly 12 is conventional and is fastened to engaging member 16 by bolts 60, and includes a clutch pressure plate 62 which faces and bears against the outer boss 52 of disk spring 22. A bracket 64 carries the conventional springs 66 which cooperate with release levers 68 to control the engagement and disengagement of the plate against the disk spring.

In operation, conical disk spring 22 is sandwiched between the engaging member 16 and the pressure plate assembly 12. The pressure plate 62 is then moved into the engage position by the use of the release levers and springs 66 and 68. Once engaged, the pressure plate 62 bears against the outer boss 52 of the conical disk spring causing deformation thereof. This deformation causes a change in resistance in the strain gages 24A–24H which is registered on the strain indicator 28. This reading is the static reading of the pressure plate and furnishes the static specification of the pressure plate. The prime mover 14 is then excited to cause rotation of the engagement member 16 which, since the pressure plate assembly 12 and the disk spring 22 are in contact therewith as well as the pilot 20 and the adapter 18, causes synchronous rotation of all the components of the test fixture. Since electrical conduits 26 are connected to slip ring assembly 30, electrical communication is maintained with the strain indicator 28 during this rotation. Due to centrifugal force, the pressure exerted by the pressure plate varies which, in turn, causes further elastic deformation of the spring through the various speeds the engagement member is driven by the prime mover. These variations in deformation are detected by the strain gages and registered on strain indicator 28. The readings taken from the strain indicator 28, due to its calibration, are in length-per-length units and normally show the strain in inch-per-inch units which can be converted to pounds of force from a previously calibrated curve of the transducer. With this information, the dynamic specification of the pressure plate assembly is determined and such can be used in specifying the type of clutch disk needed for satisfactory performance with the pressure plate assembly.

From the foregoing it can be seen that the test fixture of this invention enables one to measure the actual force being applied by the pressure plate at any and all speeds of rotation. Furthermore, this testing fixture measures the internal forces exerted by the pressure plate and hence, shows both the forces exerted under static and dynamic loading.

From the foregoing it is apparent that there has been provided in accordance with the invention a testing fixture which fully satisfies the objects, aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and scope of the appended claims.

I claim:

1. A test fixture for measuring the pressure exerted by a pressure plate of a clutch pressure plate assembly during stationary and rotational operation comprising:
   a. a rotative engaging member;
   b. means for selectively rotating said engaging member;
   c. means for connecting said pressure plate assembly to said engaging member for rotation therewith;
   d. sensing means for sensing pressure between said pressure plate and said engaging member and providing a signal proportional thereto and inserted between said pressure plate and said engaging member for rotation therewith.

2. A test fixture as claimed in claim 1 including non-rotative measuring means for measuring and indicating the value of said signal; and slip connector means for connecting the non-rotative measuring means to the rotatable sensing means.

3. A test fixture as claimed in claim 1 wherein said sensing means includes:
   a. a conical-shaped, annular disk spring for rotation with said engaging member inserted between said engaging member and said pressure plate for pressure engagement with said pressure plate and said engaging member; and
   b. means for detecting the elastic deformation of said disk spring caused by the pressure exerted by said pressure plate against said disk spring in both stationary and rotating conditions.

4. A test fixture as claimed in claim 3 wherein said means for detecting elastic deformation of said disk spring includes:
   a. at least one strain gage affixed to a surface of said disk spring; and
   b. strain indicator means in operative communication with said strain gage for indicating the deformation of said disk spring.

5. A test fixture as in claim 4 further including; positioning means for concentrically positioning said disk spring relative to the axis of rotation of said engaging member and preventing relative rotative movement but affording relative axial movement therebetween.

6. A test fixture as claimed in claim 5 wherein the positioning means includes an adapter plate concentrically fixed to said engaging member and surrounded by said disk spring; said adapter plate having an outer diameter slightly less than the inner diameter of said spring disk so as to aid in positioning said disk spring in proper relationship with said pressure plate assembly and said engaging member.

7. A test fixture as claimed in claim 6 further including communication means from said at least one strain gage to said indicator means and a tubular pilot affixed to said adapter plate and extending therefrom through said pressure plate assembly thereby affording egress means for said communication means.

8. A test fixture as claimed in claim 6 wherein said adapter plate has at least one lug projecting outwardly from the outer diameter thereof and wherein the inner diameter of said disk spring includes at least one notch which receives said lug when said disk spring is positioned around said adapter to prevent relative rotative movement between said disk spring and said adapter plate but affording relative axial movement therebetween.

* * * * *